March 3, 1970 K. FISCHER ET AL 3,499,120

TIME MULTIPLEX COMMUNICATION EXCHANGE WITH STORAGE DEVICE OF INCREASED CAPACITY

Filed Oct. 29, 1965 2 Sheets-Sheet 1

March 3, 1970 K. FISCHER ET AL 3,499,120

TIME MULTIPLEX COMMUNICATION EXCHANGE WITH STORAGE DEVICE OF INCREASED CAPACITY

Filed Oct. 29, 1965 2 Sheets-Sheet 2

United States Patent Office 3,499,120

Patented Mar. 3, 1970

3,499,120

TIME MULTIPLEX COMMUNICATION EXCHANGE WITH STORAGE DEVICE OF INCREASED CAPACITY

Kurt Fischer and Hans Höschler, Munich, Germany, assignors to Siemens Aktiengesellschaft, Munich, Germany, a corporation of Germany Filed Oct. 29, 1965, Ser. No. 505,608
Claims priority, application Germany, Jan. 14, 1965, S 95,003
Int. Cl. H04j 3/02
U.S. Cl. 179—18 12 Claims

ABSTRACT OF THE DISCLOSURE

A time multiplex exchange wherein the time spacing of the slots cycling in the circulation storage device is shorter than the spacing of the connection slots which control the connection switches of the exchange. To each connection slot there are assigned several adjacent cycling slots, and one control pulse in a connection slot is assigned to each connection. Consequently, there is more room in the circulation storage device for information than previously available, yet sufficient time is provided between control pulses for reaction of the distribution network and for the switches to achieve their settings.

This invention concerns electronic exchanges, such as telephone exchanges, operating in accordance with the time multiplex principle.

Time multiplex electronic exchanges are generally characterized by exchange of messages in successive pulses which are matched together, thereby permitting multiple utilization of connection lines. In the newer time multiplex exchanges these successive pulses are supplied with the aid of delay line storage devices which assist in maintaining the connections. For this purpose, addresses assigned to the connected line segments circulate in these delay line storage devices in different circulating time slots. To form connections these addresses are registered in delay line storage devices, while they are cancelled when the connections are to be disconnected.

The circulating addresses are emitted periodically in pulse fashion by such delay line storage devices and control connection switches assigned to the line segments, over a distributor network. To maintain a connection the connection switches assigned to the line segments are simultaneously actuated so that the line segments are connected together in the particular pulse slot. Since the connections take place at different pulse slots, generally a connection slot is assigned to each different connection.

In the known time multiplex exchanges, the intervals between cycling slots intended to be utilized to maintain connections is the same as the interval between the slots assigned to the various available circuits. Therefore, the connection slots in which the line segments are connected together coincide with the cycling slots in which information circulates in the delay line storage devices. The result is that if two line segments are to be connected together there must be available two delay line storage devices, in order that the addresses assigned to the two line segments and their respective connecting switches can be simultaneously emitted. If more than two subscriber stations and line segments are to participate in a connection, a corresponding number of more than two of the delay line storage devices must be provided for this purpose (see 1963 patent application Ser. No. 306,062, now abandoned assigned to the same assignee as the present application).

It is possible to save this additional delay line storage device if several connection slots are employed for a connection, instead of a single connection slot, so that the connecting switches associated with the concerned line segments are not simultaneously actuated, but rather are successively actuated. In this case speaking energy registers are required to bridge together the interval between the connection slots during which the connecting switches are operated (see 1963 patent application Ser. No. 305,960, now abandoned assigned to the same assignee as the present application). Since special measures must also be taken in order to cause the addresses of the connecting switches (or the participating line segments) to circulate in different cycling slots in the delay line storage devices, the control part of the electronic exchange of such a system is correspondingly more complicated. If the connection slots and the cycling pulse slots coincide, then the result is that there is no room for further information in the delay line storage devices in which the addresses of the line segments circulate. Therefore, information additional to the addresses of the line segments can be taken care of only by additional delay line storage devices Such information may be, for example, call counting criteria assigned to the individual connections. (See German Patent Nos. 1,159,519 and 1,177,214.)

In a system of this type, if the additional information is to be registered in the same delay line storage devices, in the cycling slots, then the number of connections which could exist simultaneously would necessarily be reduced, by reason of the coincidence between the connection slots and the cycling slots. Moreover, such a reduction is already necessary when more than one connection slot is employed for the connection of line segments taking part in a single connection. That is, the number of connection slots cannot be increased arbitrarily, since the switching times of the connection switches cannot be arbitrarily decreased, among other reasons.

The object of the present invention is to solve the above-mentioned difficulties. That is, the invention is particularly designed to function when a large number of subscriber stations is to participate in the same connection, or if additional information of various kinds which must be independently evaluated is to be stored in the delay line storage devices employed for the addresses of connection stations. An object of the invention is to allow a single delay line storage device to function for these purposes, without increasing the number of connection slots or without decreasing the number of connections which can exist simultaneously.

Generally speaking, the invention is therefore concerned with a circuit arrangement for exchanges for communication purposes (and more particularly for telephone purposes), which exchanges operate in accordance with the time multiplex principle and employ at least one delay line storage device which serves and maintains intact the connections associated with that exchange. The system of the invention employs the said delay line storage device to emit periodically in pulse fashion the addresses assigned to line segments which are circulating therein in different time slots, and which then operate connecting switches over a distributor net, to thereby connect together the line segments participating in a connection. The circuit arrangement of the invention is characterized by the fact that the interval between the cycling or circulating slots intended to be utilized in the delay line storage device is smaller than the interval between the available connection slots, so that the number of circulating slots is greater than the number of connection slots. That is, the delay line storage device can contain more information which is to be independently evaluated, such as addresses, charge counting criteria etc. than the number of available connection slots. For this purpose, the invention employs intermediate registers which both register and may prolong the pulses appearing in the addresses before such pulse addresses are conveyed to the addressed connection switches.

An intermediate register can be assigned to each apparatus to which the pulse is to be conveyed. In the simplest case such an intermediate register can be connected directly in front of a connection switch. As will be shown hereinafter, connections can be then established including two, three or more subscriber stations, yet only a single connection slot need be employed. Further, only one single delay line storage device is necessary to supply the addresses needed for the different connection switches. It will be recognized that the number of intermediate registers required corresponds to the number of the subscriber stations to be connected. The additional reqirements which are necessary when more than two subscriber stations are to participate in the same connection is therefore smaller, the smaller the number of the subscriber stations which may participate in connections. The invention can therefore be applied most advantageously for exchanges which service only a relatively few subscriber stations, as is often the case in private branch exchanges. It is also particularly suitable to insert an intermediate register between each delay line storage device and the distributor network. The number of intermediate registers depends in this case upon the number of signal elements forming an address, because each signal element can be represented by a pulse which is to be registered and, in suitable cases, to be prolonged. As will be explained hereinafter, the number of intermediate registers is then multiplied by the number of circulating slots within a connection slot, however, the number of intermediate registers is considerably smaller than the number of these subscriber stations, in particular when very many subscriber stations are connected to an exchange.

The intermediate registers are particularly suitable also for service as pulse prolonging devices, for instance when the addresses are supplied thereto in pulse fashion by the delay line storage device and must control the connection switches over a distributor network. By reason of the oscillating processes which occur in the distributor network, as well as the time required for switching operations of the connecting switches, these pulses must have a certain minimum spacing and minimum length. In the delay line storage devices provided by the invention it is now possible that considerably shorter pulses circulate with considerably shorter pulse spacings. These pulses are prolonged with the aid of the pulse prolonging circuits, so that pulses of suitable length are then conveyed forward. However, additional circulating slots are then available in the delay line storage device, and additional information in the form of short pulses can circulate between those short pulses which pertain to addresses supplied to the distributor network. Then the pulse succession fequency or cycle in the delay line storage device is a multiple of the pulse succession frequency in the distributor network, so that the number of the circulating slots is correspondingly larger than the number of connection slots.

The pulses pertaining to additional information can be emitted directly from the delay line storage device to other apparatus, or, alternatively, the pulses can be supplied to pulse prolonging circuits which in turn supply these pulses to apparatus operable to recognize the longer pulses. Further, addresses of subscriber stations circulating in the delay line storage device can be emitted over such intermediate registers. It is practical in the input and output apparatus associated with the delay line storage device to operate at lower current level than that which must be employed to operate connection switches, because of the intervening intermediate registers in the apparatus of the invention. This of course is advantageous because in the case of semiconductor amplifiers, employing transistors, the smaller the load drawn from the transistors, the shorter the switching and response time thereof.

The invention will now be described more fully in conjunction with operative embodiments thereof shown in the accompanying drawings. In the drawings.

Figure 1:
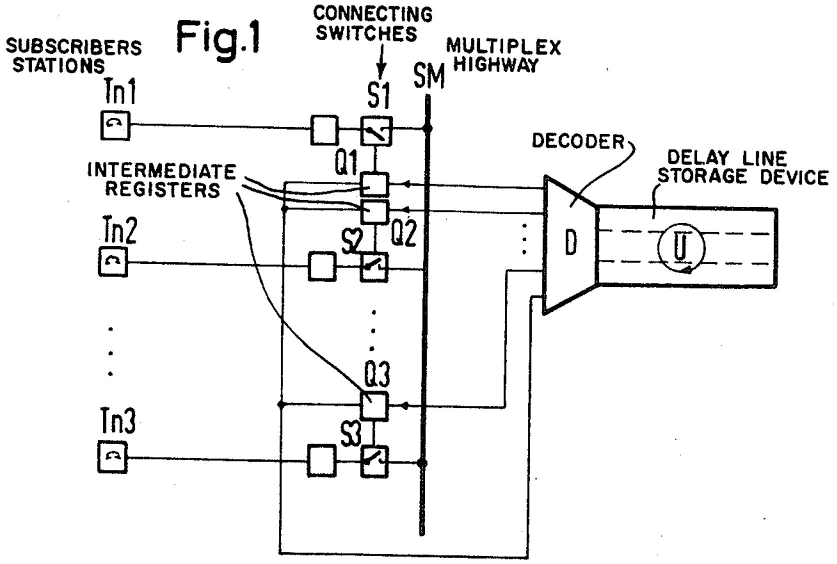
FIG. 1 is a block diagram of a communication exchange employing a single delay line storage device for connecting two or more subscribers together in each individual single connection.

In the apparatus of FIG. 1 each of the several subscriber stations T*n*1, T*n*2 . . . T*n*3 is shown as connectable to the speaking multiplex rail or highway SM by way of respective connecting switches S1, S2 . . . S3. In front of each connection switch is connected a respective intermediate register Q1, Q2 . . . Q3.

The addresses of the line segments associated with subscriber stations participating in a connection, and of the connection switches connected to such segments, circulate in delay line storage device U, in different circulating slots. These addresses control the connection switches over the distributor network consisting of the decoder D and the lines leading from the outlets of the decoder to the intermediate registers. If one of such addresses is emitted at the output of the delay line storage device, then a pulse is conveyed to the connection switch identified by this address, with the aid of the decoder D, in a manner which is itself known. This pulse first reaches the intermediate register associated with that connection switch, since the registers are connected in front of the connection switches. In accordance with the invention, a bistable flip flop circuit may be employed as the intermediate register. This flip flop may be set by the pulse conveyed to it, and, after forwarding of this pulse to the connection switch, may be switched into reset condition.

As an illustration of operation of the apparatus of FIG. 1 there will now be described a connection in which the subscriber stations T*n*1 . . . T*n*2 and T*n*3 all participate. For this purpose the three addresses of the three stations and their corresponding connection switches must circulate in the delay line storage device U. As can be seen in diagram FIG. 2*a*, the address assigned to the connection switch S1 circulates in circulation slot *uxa*, while the address of connection switch S2 circulates in slot *uxb*, and the address of switch S3 circulates in circulation slot *uxc*. In each cycle of operation of the apparatus, the address of the switch S1 is emitted in pulse fashion by the delay line storage device U, so that a corresponding pulse is directed to the intermediate register Q1 and sets that circuit. Thereafter, the address of switch S2 is emitted by the storage device and causes the flip flop circuit Q2 to be set. (The registers may be bistable flip flops.) Finally, the address of switch S3 is emitted and causes the flip flop circuit Q3 to be set.

It will be seen that the apparatus of FIG. 1 is provided with an outlet from the decoder D which is connected in multiple to each one of the intermediate registers Q1 . . . Q3. The circulation slot *uxd* is emitted over this connection to all of these flip flop circuits and resets the flip flops while they are caused to simultaneously operate the associated switches.

Figure 2:
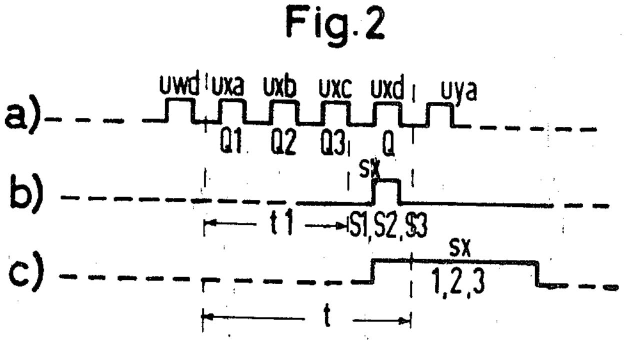
FIG. 2 shows the cycling or circulating slots and connection slots which may be used with the apparatus of FIG. 1.

This operation of actuating the switches occurs at connection slot *sx*, shown in FIG. 2*b*, and being coincident with circulating slot *uxd*. Since the three switches S1 . . . S3 are simultaneously actuated, the corresponding three subscriber stations are simultaneously connected to the multiplex rail SM. This operation is of course repeated in each cycle of the addresses circulating in the delay line storage device U, so that the connection between the three subscriber stations is renewed periodically.

It will be seen that all of the addresses controlling different connection switches circulate in the same delay line storage device in different circulation slots, even though these switches are to be actuated in the same connection slot. In such case, as is usual in the time multiplex exchange, several connections can be maintained simultaneously in different connection slots. If the number of connections to be permitted to exist simultaneously is not very large, then the pulses appearing in the circulation slots can be equal in length to the pulses appearing in the connection slots which control the connection switches. In the diagrams of FIGS. 2*a* and 2*b* there are shown pulses of this type. During the intervals between pulses of the connection slots, the multiplex rail SM is not connected with subscriber stations. During these intervals (one being shown in FIG. 2*b* at *t*1) the multiplex rail can be grounded so that cross talk between the different connections can be foreclosed.

On the other hand, if it is intended that a relatively large number of connections can exist simultaneously over the exchange, then the number of the circulation slots intended for utilization in the delay line storage device must be correspondingly larger. The pulses appearing at these circulation slots are then correspondingly shorter. It is then advisable to make the pulses supplied by the intermediate registers considerably longer than the pulses appearing in the connection in the circulation slots. In such case the time relationships illustrated by FIGS. 2*a* and 2*c* may exist. In such relationship, a pulse is supplied in connection slot *sx*, corresponding to circulation slot *uxd*, but as shown in FIG. 2*c*, the pulse *sx* is considerably longer than the circulation slot pulse. In such case the exchange can take care of as many simultaneous connections as in the case of use of several delay line storage devices.

In the example given above, the forward switching of the pulses through the bistable flip flop circuits employed as intermediate registers was carried out with the aid of an address circulating in the slot *uxd*. This address causes synchronizing pulses to be supplied at the connection slots and to place in reset condition the respective flip flop circuits, after the registered pulses are conveyed forward. The circulation of this additional address can be eliminated if a generator is provided to supply synchronizing pulses of this kind to all of the flip flop circuits, in the requisite connection or switching slots. This is especially suitable when the circulation slots previously utilized for this purpose have equal time intervals, as is usually the case. If such a generator is employed, other information can be stored in the circulation slots formerly required for this reset and onward switching function, and such information may be emitted, for example over the decoder D, if special outlets of the decoder are provided for this purpose.

The possibility of establishing connections for more than two subscriber stations is particularly important for exchanges of the private branch type. This is for the reason that in such exchanges different operating conditions have always occurred when three or more subscriber stations participated in a single connection. Such an operating condition may exist, for example, if a consultation connection is made from one subscriber station connected with another station over a trunk relay repeater, whereupon the station is connected to the consultation subscriber station. Another operating condition to be considered occurs if the same subscriber station is rather connected temporarily with the PBX switchboard or operator station. In addition, the first-mentioned operating condition can occur, wherein three subscriber stations are simultaneously connected to each other, with equal stature, in a so-called conference connection. In a conference connection also more than three subscriber stations can participate.

For the purpose of making these various alternative operating conditions possible, the system of the invention operates to provide sufficient circulating slots for each switching slot that all desired subscriber stations can participate in a connection. If, for example, six subscriber stations are to be permitted to participate, then seven circulating slots are provided for a switching slot.

The invention is also advantageous even when only two subscriber stations are to participate simultaneously in a connection, since in such case it is still possible to use only a single delay line storage device, instead of two such devices. In such case the decoder associated with this delay line storage device can also be employed to convey additional addresses to the storage device from other stations, in order for instance to question subscriber circuits, or the terminal circuits pertaining to certain line segments, with respect to the operating condition of the line segments. This is for the reason that in this case also only a single line segment, or a single terminal circuit is assigned to one address.

Figures 3, 4:
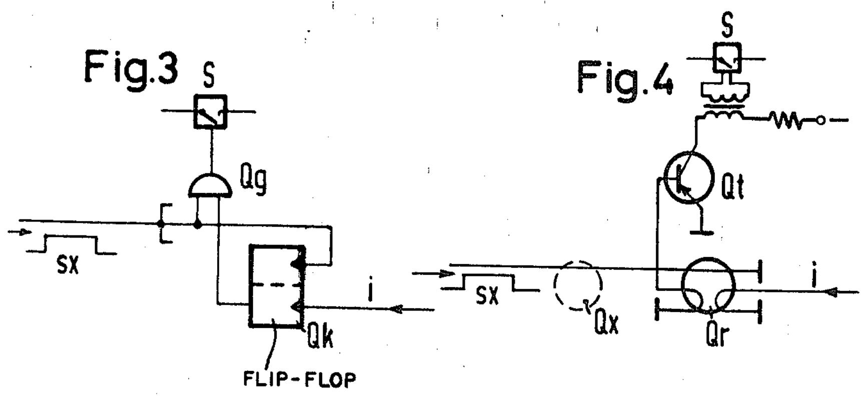
FIG. 3 is a schematic illustration of one possible type of intermediate register for use with the apparatus of FIG. 1.
FIG. 4 is a schematic showing of a different form of intermediate register usable with the apparatus of FIG. 1.

The apparatus of FIG. 3 comprises an intermediate register of the type that may be employed for the registers Q1 . . . Q3 of FIG. 1. This register employs a flip flop circuit diagrammatically indicated at Q*k* and an AND gate or coincidence gate Q*g*. The set input of the flip flop Q*k* is provided with an appropriate set pulse from the decoder D over the line *i*, thereby causing a voltage to be supplied to one input of the AND gate Q*g*. The reset input of the flip flop Q*k* is supplied with pulse *sx*, at the connection slot. This pulse is also supplied to the other input of the AND gate Q*g*. As a result of these connections, the AND gate Q*g* supplies an actuating pulse to the switch S at the moment of arrival of the connection slot pulse *sx*. Simultaneously the flip flop Q*k* is reset to its normal condition. The flip flop can be appropriately designed so that the reset action does not occur until the end of pulse *sx*. In such case the flip flop circuit can be employed to prolong the supplied pulse input. As indicated in FIG. 3 by the multiple connection sign to the left of the connection to the AND gate Q*g*, the pulse *sx* is supplied to all intermediate registers to cause actuation of the appropriate switches and resetting of the appropriate registers.

FIG. 4 shows the use of a ferromagnetic ring core Q*r* for the intermediate register. This core is preferably of the type which has a rather rectangular-shaped hysteresis loop. The apparatus of FIG. 4 also includes a transistor Q*t* with its base to emitter circuit connected across one winding of the core Q*r*. The pulse supplied by the decoder D is connected over line *i* to a second winding of the core Q*r* so that the core is flipped to a "1" condition when the decoder provides a set pulse. The winding arrangement and the transistor polarity, however, are such that the resultant pulse supplied to the transistor does not turn it on but rather maintains it in the cutoff condition. A third winding of the core Q*r*, however, is provided with the connection slot pulse *sx* to reset the core to its original or reset condition, which may be indicated by the binary "0." When the core flips back to the "0" condition, a second voltage pulse is provided to the base of transistor Q*t*, this time in appropriate phase to turn the transistor on. The result is that current flows in the collector circuit of transistor Q*t*, supplying a voltage across the secondary of the transformer to the switch S to operate that switch.

As is indicated by the dotted line circle and legend Q*x*, the connection slot pulse *sx* is appropriately provided to all of the cores for the various intermediate registers, by appropriate series connection of those cores with the decoder D.

Figure 5:
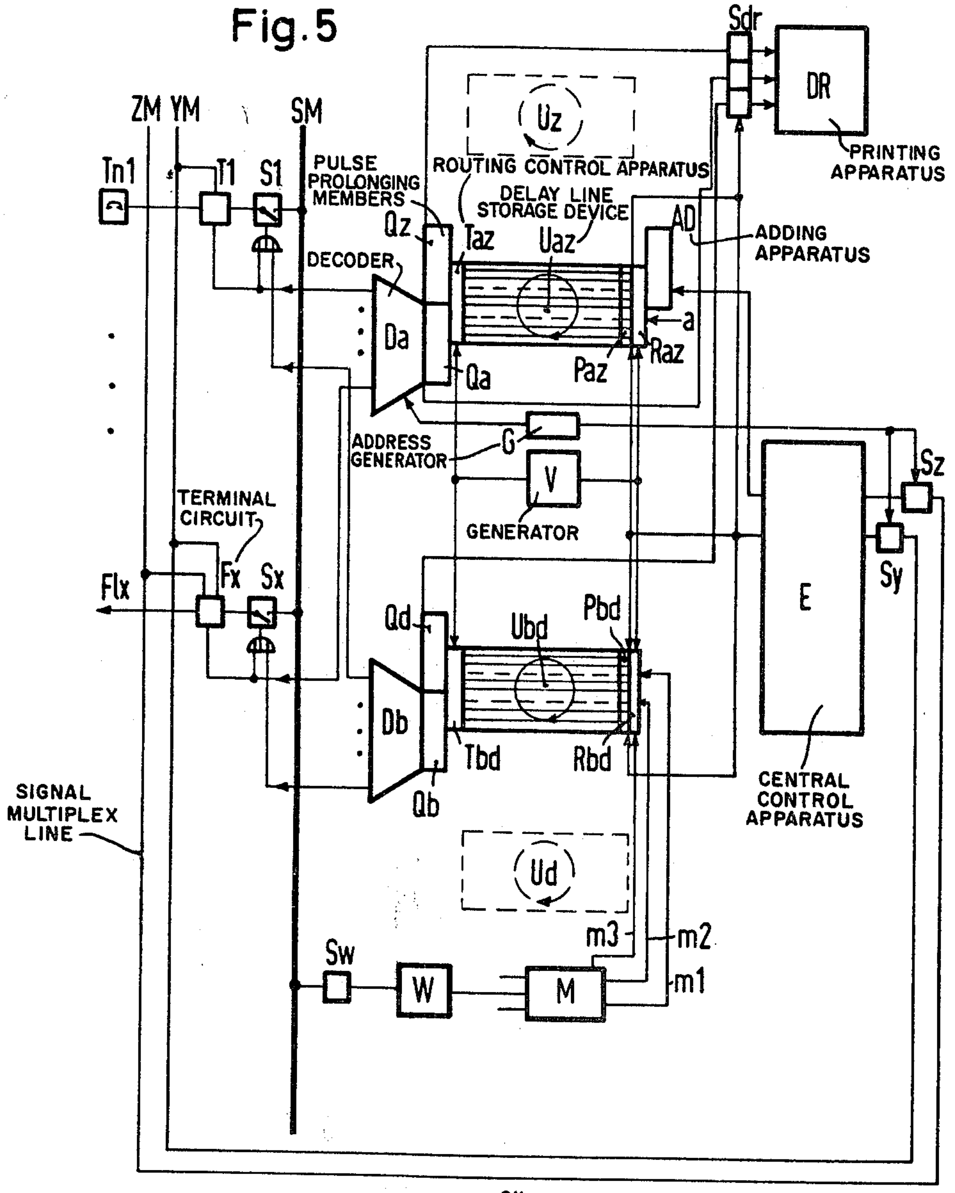
FIG. 5 is a block diagram view of a modified form of communication exchange in accordance with the invention; and, FIG. 6 shows the relationship between the pulses employed in the apparatus of FIG. 5.

It has been previously indicated that the intermediate registers can be connected between the delay line storage devices and the distributor network, rather than between the distributor network and the connection switches. An example of an exchange having such a circuit arrangement is shown in FIG. 5. The pulse prolonging members Q in FIG. 5 are employed as intermediate registers. Additional information circulates in the particular delay line storage devices, such information being appropriate to the connections which are connected together during a switching slot.

In the apparatus of FIG. 5 it is possible to provide for as many simultaneous connections as the number of connection slots provided.

The exchange of FIG. 5 is a further development of a time multiplex exchange which is itself known (see German Patent No. 1,159,519) and wherein the determination of charge counting criteria is also provided for. Such criteria are determined in the system of the said German patent by use of a special delay line storage device. In the apparatus of FIG. 5, however, it is possible to cause the charge counting criteria to circulate on one of the delay line storage devices U*az* or U*ad* employed for connection purposes, so that it is not necessary to provide a special additional delay line storage device for charge counting criteria. Further, with the apparatus of FIG. 5 it is not necessary to provide a special delay line storage device to contain addresses of called subscriber stations which are not connected to the exchange itself, but which are accessible to that exchange only over lines extending outward therefrom.

The apparatus of FIG. 5 is most easily explained during a description of the operation thereof. In that apparatus it will be seen that subscriber circuit T1 and connection switch S1 are associated together with subscriber station T*n*1. As indicated by the dots below the subscriber circuit T*n*1, a number of additional subscriber stations may be similarly connected, as may be the subscriber station T*n*1, to the multiplex line SM.

FIG. 5 also shows a line F1*x* which extends toward another exchange office and with which is associated a terminal circuit F*x*. The terminal circuit F*x* is in turn to be provided with apparatus for forwarding arriving counting or metering pulses, and a connection switch is associated with the terminal circuit and designated S*x*. This switch is operable to connect the terminal circuit to the multiplex rail SM.

The connection switches S1 . . . S*x* are controlled with the aid of addresses circulating in delay line storage devices U*az* and U*bd*. Decoders D*a* and D*b* are associated with these delay line storage devices, respectively. The delay line storage device U*az* also stores charge counting criteria, in addition to addresses, while the delay line storage device U*bd* stores addresses by which subscriber stations associated with other exchanges are identified, this being in addition to storage of addresses of appropriate connection switches of the exchange shown in FIG. 5. The manner in which this simultaneous storage of independent information is possible will be explained hereinafter. Suffice it to say at this point that the apparatus of FIG. 5 avoids the necessity of use of separate delay line storage devices U*z* and U*d*, respectively indicated above and below the storage devices U*az* and U*bd*, and which otherwise would be necessary to store charge counting criteria and addresses of stations associated with other exchanges, respectively.

In the apparatus of FIG. 5 the delay line storage devices U*az* and U*bd* are further indicated as provided with additional special apparatus to make the described operation thereof possible, such apparatus including the information input and cancellation apparatus P*az* and P*bd*, respectively. These information input and cancellation features may be provided by apparatus of the type shown in Kneisel and Honold application Ser. No. 390,-026, filed Aug. 17, 1964 (now Patent No. 3,366,741) and assigned to the assignee of the present application.

The delay line storage device U*az* is also provided with a routing control apparatus T*az* which provides for control of which of the two pulse prolonging member Q*a* and Q*z* is provided with the pulse instantaneously emitted by the storage device U*az*. This routing apparatus thus operates like a commutator which is itself known and is controlled by a generator V which supplies routing pulses. The generator V is also connected to a routing control apparatus T*bd* at the output of the storage device U*bd* and which performs a corresponding function to the routing apparatus T*az*. That is, it forwards information circulating in the delay line storage device U*bd* alternatively to the pulse prolonging members Q*d* and Q*b*.

The generator V for routing pulses is also connected to further routing apparatus which causes information to circulate with the first or the second of a pair of circulation slots, for each item of information. The additional routing apparatus associated with delay line storage device U*az* is designated R*az*, while that associated with delay line storage device U*bd* is designated R*bd*. The information to be registered is thus first conveyed to these routing apparatuses and from there to the delay line storage device associated therewith. The routing apparatus R*az* is provided with counting or metering pulses over adding apparatus AD, these counting pulses serving for charge counting criteria. Moreover, as indicated by the arrow *a*, the addresses of subscriber stations which have requested a connection are also connected to this routing apparatus.

The addresses of subscriber stations which have been called are indicated by dial information conveyed over the multiplex rail or highway SM to digit receivers. For instance, the digit receiver W is shown connected to the rail SM over the connection switch S*w*. Dial information picked up by such receiver is conveyed to apparatus M which serves for evaluation thereof and for forwarding of such information to the routing apparatus R*bd*. For instance, information identifying subscriber stations associated with the exchange of FIG. 5 is forwarded to the routing apparatus over line *m*2, while the addresses of subscriber stations not connected to this exchange, but rather connected to another exchange, are supplied to the routing apparatus over line *m*1. In addition, the apparatus M is provided with the control line *m*3 which sends routing signals to the routing apparatus in order that addresses to be stored in the delay line storage device U*bd* can be caused to circulate in either the first or the second circulation slot of a pair of circulation slots. In such fashion it may be provided that addresses of subscriber stations connected to the illustrated exchange are caused to circulate in a first slot, while address of subscriber stations of other exchanges are caused to circulate in a second circulation slot.

The apparatus of FIG. 5 is also provided with an address generator G which successively conveys to the decoder D*a* the addresses of the different subscriber stations associated with the exchange of FIG. 5, as well as the addresses of lines extending to other exchanges. Alternatively, the addresses may actually be identifications of the affiliated subscriber circuits and terminal circuits T1 . . . F*x*. As a result of being supplied with these addresses, the decoder D*a* emits interrogation pulses to the respectively identified subscriber circuits and terminal circuits. The interrogation circuits then supply pulses indicating the operating condition thereof, these pulses being directed over the signal multiplex line YM, to the central control apparatus E. In addition, the line terminal circuits may appropriately provide charge counting pulses to the central control apparatus E, over the multiplex rail ZM.

The signal multiplex lines YM and ZM are respectively connected to the central control apparatus E over switches S*y* and S*z*. These switches are normally opened but are closed during the supplying of addresses, so that undesired pulses are prevented from being supplied to the control apparatus E. The control apparatus E forwards the charge pulses which are to be counted, to the adding apparatus AD, over the indicated line. The control apparatus of course also will take care of the necessary control processes for the exchange, in the fashion already known. One of these control processes consists of the supply of addresses of the calling subscriber stations, over line *a*. The apparatus necessary for this function is not specifically shown or described herein, since it is commonly known. Rather the control processes are merely indicated by the lines extending from the central control apparatus E to the routing apparatus R*az* and R*bd*.

As has already been indicated, the addresses of subscriber stations and other information, such as the call counting criteria, are emitted by the delay line storage devices. The addresses of subscriber stations associated with the exchange illustrated in FIG. 5 are emitted over the decoders D*a* and D*b*. The decoder D*a* supplies the address of the calling subscriber and decoder D*b* the address of the called subscriber. The addresses of subscriber stations associated with other exchanges are emitted over the pulse prolonging circuit Q*d* and are thereby furnished to the read-out as printing apparatus DR which prints out the charge metering result. Switches S*dr* are connected ahead of the printing apparatus. Also connected to the printing apparatus over the associated switches are the charge counting criteria supplied from the pulse prolonging member Q*z*. In addition, one of the switches S*dr* conveys the address of calling subscriber stations to the printing apparatus DR. For this purpose a line is provided from the pulse prolonging member Q*a* to the printing apparatus DR.

The addresses circulating in the first of a pair of circulating slots are emitted at the delay line storage device U*az*, over the pulse prolonging devices Q*a* and the decoder D*a*. These addresses are also conveyed from the pulse prolonging members Q*a* to one of the switches S*dr*. The charge counting criteria circulating in the second circulating slot of the pair of slots are conveyed from the pulse prolonging device Q*z* to another one of the switches S*dr*.

The called station addresses circulating in the first slot of a pair of circulating slots are emitted over the pulse prolonging members Q*b* from the delay line storage device U*bd*, and over the decoder D*b*. The addresses circulating in this storage device in the second circulating slot are, however, forwarded over the pulse prolonging apparatus Q*d* to the third one of the switches S*dr*.

The addresses of such subscriber stations which are connected in the same connection and are connected to the indicated exchange circulate in the same circulating slot. The other information pertaining to a connection circulates in the second slot of a pair of circulation slots associated with that connection. A connection slot is supplied for each pair of circulating slots, to actuate the connection switches associated with the exchange. The switches S*dr* are actuated by the control apparatus E in order that the information can be supplied to the printing apparatus DR. Such printing takes place appropriately at the end of a call and the information circulating up until this time in the delay line storage devices U*az* and U*bd* are then cancelled.

Figure 6:
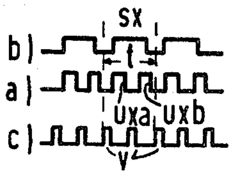

FIG. 6 shows the relative positions of the circulating slots and the associated connection slots. For one thing, FIG. 6*a* shows a pair of immediately successive circulating slots *uxa* and *uxb*, both associated with connection slot *sx*, the latter being shown in FIG. 6*b*. It will be seen that the pulse of the connection slot *sx* is considerably broader than the pulses of the circulating slots. The pulse of connection slot *sx* is of course produced from the pulse of circulating slot *uxa* with the aid of the pulse prolonging members Q*a* and Q*b*. FIG. 6*c* also shows the routing pulses *v* supplied by the generator V. The routing apparatus T*az* and T*bd* are of course operated by the pulses *v* to distribute the information supplied by the delay line storage devices U*az* and U*bd* to the different pulse prolonging members. These routing pulses are also conveyed to the routing apparatus T*az* and T*bd*. Certain pulses are also prolonged with the aid of the pulse prolonging devices Q*z* and Q*d*. The pulse prolonging device Q*z* represents intermediate registers which register and prolong such pulses and which are not assigned to addresses but rather to other types of information. In such case the registration takes place before such information is conveyed to other apparatus, as for instance over one of the switches S*dr* to the printing apparatus DR.

It will be evident that the apparatus of FIG. 5 can be changed in different manners. The fewer the subscriber stations connected to the illustrated exchange, the fewer the number of connection slots required. The number of circulating slots then is also reduced. If the pulses of the circulating slots are sufficiently long, special pulse prolonging members may not be necessary, since the connection slots may be of the appropriate length. If there are provided four circulating slots in the delay line storage device U*az*, instead of two circulating slots, then this delay line storage device can also take over the function of delay line storage device U*bd* since the information circulating normally in that device can now circulate in the device U*az* in the additional circulating slots. For such purpose a routing apparatus must provide four routing paths, rather than two.

Another modification can provide for circulation of additional information assigned for instance to subscriber stations or other apparatus, in the delay line storage devices, this additional information circulating in slots which are free of other purposes. Such information can be of the type not assigned to particular connections.

Information registered in the delay line storage devices, such as addresses and charge counting criteria, are represented by code signals having several binary code elements. One transit time link is provided for each code signal element, each transit time link being appropriately formed by magnetostrictive wires of appropriate length, through which the pulses travel (see copending Kneisel and Honold application Ser. No. 390,026, now Patent No. 3,366,741 filed in Aug. 17, 1964, and assigned to the assignee of this application). In such case an amplifier element can be employed to reinsert a pulse at one end of the wire, as it arrives at the other end of the wire, so that a periodic circulation of the individual pulses is obtained. This amplifier circuit can also be employed to insert a new pulse in an appropriate slot, and cancellation of the circulating pulse of a particular slot can be achieved through interruption of the amplifier operation. In the magnetostrictive type of system indicated, the number of wires required depends on the maximum number of signal elements required for the code.

Of course, the addresses of subscriber stations which are not associated with the particular exchange shown would normally be longer than the addresses of stations associated with that exchange. In the absence of special measures, the number of transit time links provided in the delay line storage device U*bd* then would have to be sufficiently long to take care of the addresses of subscriber stations of other exchanges. However, in the case of circulation of an address of a station associated with another exchange, the first slot of the pair of circulating slots is not seized by any information. In such case part of the address which would normally be circulating only in the second slot may instead circulate in the first slot, in order that no additional transit time links may be required for an address of a subscriber station not associated with the particular exchange. However, it is also possible to provide additional apparatus to arrange that the parts of the same address emitted successively by the delay line storage device are conveyed to the same appropriate apparatus of destination, and appropriately put back together prior to reaching that apparatus. For this purpose pulse prolonging members can be employed.

The time intervals between circulating slots can be selected to be very small if the delay line storage device is employed (see, for example, the Review of Scientific Instruments, July 1956, pp. 437 and the following). Consequently, the number of circulating slots can be a multiple of the number of connection slots. Instead of wire type transit time links, individual register elements can be employed. Further, in place of the delay line storage devices other types of registers which can be interrogated cyclically, may also be employed.

It will be evident that many other minor changes could be made in the apparatus particularly illustrated herein. Accordingly, the invention is not to be considered limited to the apparatus specifically described, but rather only by the scope of the appended claims.

We claim:

1. A circuit arrangement for communication exchanges operating in accordance with time multiplex principles and having at least one delay line storage device for maintaining and servicing connections and which periodically emits in pulse form in different cycling slots information including the addresses of line segments which are participating in connections, the arrangement including connections switches associated with the line segments connected to the exchange, said connection switches being operable when actuated to connect their associated line segments to a common multiplex highway, wherein the improvement comprises means including intermediate registers supplied from said storage device with at least certain ones of the pulses in said cycling slots and operable to develop connection control pulses from those pulses, each control pulse being located adjacent the cycling pulses corresponding to the line segments participating in the connection of that control pulse, the control pulses being always time-spaced farther apart than the associated cycling pulses, and said means being operable to supply a single control pulse for each connection to operate the switches participating in that connection as indicated by the cycling pulses, whereby more information may be stored in the delay line storage device than the number of connection slots available to establish connections.

2. The apparatus of claim 1 in which said intermediate registers are operable to prolong the pulses in cycling slots received thereby to develop control pulses in connection slots which are longer than the circulation slots.

3. The apparatus of claim 1 in which said delay line storage device (e.g., Qz) is operable to store and periodically emit other information than addresses of line segments, and including read-out apparatus (DR) for such other information, said intermediate registers being operable to store such other information upon emission thereof from the delay line storage device and to supply it to said read-out apparatus.

4. The apparatus of claim 1 including a distributor network connected between said delay line storage device and said connection switches and in which one of said intermediate registers is assigned to each said connection switch and is operable to receive a pulse in a cycling slot from said distributor network when its associated connection switch is addressed by pulse-form emission from the delay line storage device and to supply a control pulse to its associated connection switch to operate it.

5. The apparatus of claim 1 including a distributor network connected between said delay line storage device and said connection switches and in which said intermediate registers are connected between said delay line storage device and said distributor network.

6. The apparatus of claim 1 in which each said intermediate register includes a bistable flip flop circuit operable to be set in operating condition by a cycling slot pulse applied thereto and to be reset to quiescent condition at a time thereafter determined by the selected length of the connection slot.

7. The apparatus of claim 6 including means operable to supply a synchronizing pulse at the beginning of each connection slot to each said flip flop circuit to reset those circuits to quiescent.

8. The apparatus of claim 1 in which each said intermediate register includes a ferromagnetic core of substantially rectangular-shaped hysteresis loop characteristic, said register being operable to be set in operating condition by a cycling slot pulse supplied thereto and to be reset to quiescent condition at a time thereafter determined by the selected length of the connection slot.

9. The apparatus of claim 8 including means operable to supply a synchronizing pulse at the beginning of each connection slot to each said ferromagnetic core to reset those cores to quiescent condition.

10. The apparatus of claim 1 in which said delay line storage device is operable to circulate therein in different cycling slots addresses of different line segments connected together in the same connection slot.

11. The apparatus of claim 10 including means operable to supply a synchronizing pulse at the beginning of each connection slot, said synchronizing pulses being spaced apart by more than two cycling slots so that more than two stations can participate in a single connection.

12. The apparatus of claim 10 including means operable to supply a synchronizing pulse at the beginning of each connection slot, said synchronizing pulses being spaced apart by at least two cycling slots so that information concerning a connection, in addition to the address of a line segment participating in that connection, may circulate in slots located between connection slots.

References Cited

UNITED STATES PATENTS

| | | | |
|---|---|---|---|
| 2,894,070 | 7/1959 | Dayonnet et al. | 179—18 |
| 3,293,369 | 12/1966 | Schroeder | 179—18 |
| 3,319,005 | 5/1967 | Gaunt | 179—18 |

KATHLEEN H. CLAFFY, Primary Examiner

T. W. BROWN, Assistant Examiner